July 18, 1939.  J. L. LUCKENBACH  2,166,167
APPARATUS FOR SEPARATING PRECIOUS METALS FROM THEIR ORES
Filed Nov. 18, 1936
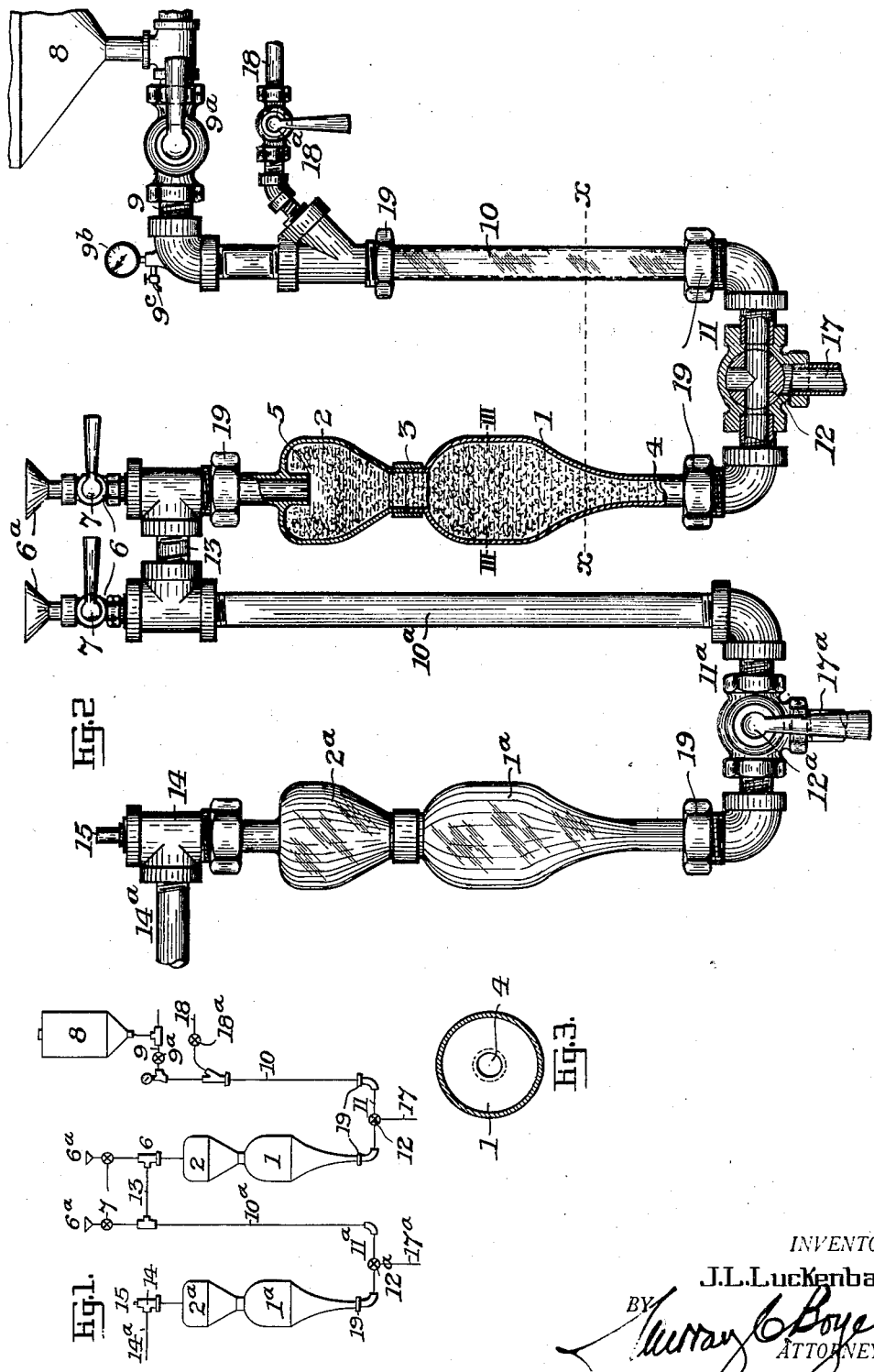
INVENTOR.
J. L. Luckenbach,
BY
ATTORNEY.

Patented July 18, 1939

2,166,167

UNITED STATES PATENT OFFICE 2,166,167

APPARATUS FOR SEPARATING PRECIOUS METALS FROM THEIR ORES

John Lewis Luckenbach, Jackson Heights, N. Y.

Application November 18, 1936, Serial No. 111,467

1 Claim. (Cl. 209—183)

My invention relates to the separation and recovery of gold and/or other precious metals contained in gold-bearing sands, auriferous ores and the like, by passing the gold-bearing material through a body (or bodies) of mercury held in suspension by means of controllable pressure induced by the flow of a suitable fluid such as water, or by air or gas under pressure, which serves to convey the gold-bearing material into and through the body (or bodies) of mercury. The quantity of the more or less solid gold-bearing content of the flowing body of material is preferably predetermined before entering the system for passage through the body or bodies of mercury contained therein.

The object of my invention is to recover the gold or other precious metals by amalgamation, in such manner and by such means that the residue or gangue from the gold-bearing sands, auriferous ores, or the like, may be removed en masse after passage through the mercury; the particles of gold present in such material contacting with the mercury during such passage and amalgamating therewith while the residue or gangue impossible of amalgamation, passes through the mercury to a point of discharge. After such operation the separated gold may be reclaimed by heating or vaporizing the gold-charged mercury in a suitable retort or crucible; the gases from the mercury being condensed for reclamation of most if not all of the mercury and the gold being recovered in the retort, crucible or other container in which the gold bearing mercury or amalgam is heated.

These and other features of my invention are more fully set forth hereinafter; reference being had to the accompanying drawing, more or less diagrammatic in character, in which:

Figure 1 is a diagrammatic view, on a reduced scale, of one form of apparatus within the scope of my invention and in which my improved method or process may be carried out.

Fig. 2 is an enlarged view, partly in section, of part of the apparatus shown in Fig. 1, and Fig. 3 is a sectional view on the line III—III, Fig. 2.

My invention comprises the employment of one or more expansion chambers disposed in vertical alignment, and proportioned and graduated in size for a purpose hereinafter described, in which bodies of mercury, which may be in predetermined quantities, are placed. The mercury may be introduced into these chambers from a suitable inlet above the same and is maintained therein by means of hydrostatic pressure, or by gas or air pressure, entering the lower chamber from a suitable point below the same with a mass of the gold-bearing material which may be in the form of a pulpy solution. The body of mercury becomes activated or agitated and suspended by such hydrostatic or other pressure, causing turbulence and agitation and creating globules which in turn form additional attractive amalgamating surfaces for the gold particles besides flowing through such globules, which are then forced by the hydrostatic or other pressure from the lower expansion chamber into an upper expansion chamber.

The chambers employed with my improved apparatus and containing mercury intended to amalgamate with the gold particles present in the material being treated, have a relatively contracted lower portion and an enlarged upper portion permitting expansion of the charged mass of mercury during the agitation or turbulence of the amalgamating treatment.

The mercury-receiving chambers are indicated at 1 and 2, with a connecting passage 3, which may be slightly larger than the inlet 4 leading to the chamber 1, or the outlet 5, leading from the chamber 2. Additionally, the outlet 5 depends into the chamber 2 so as to render it possible to discharge non-amalgamating residue through said chamber without undue disturbance and/or discharge of the gold-containing mercury or amalgam contained therein.

A charge of mercury may be delivered into the mercury-containing chambers 1 and 2 from a point above the same through a connection 6, valved at 7; a funnel $6^a$ carried by the connection 6 facilitating introduction. The mercury will lie in the chamber 1 and in so much of the piping and other connection of the system after introduction and before the separating operation commences, at about the level indicated at $x$—$x$.

The gold-bearing material comprising placer sand, auriferous ore and/or the like, in a finely divided state and in the form of a pulpy mass—made so by the addition of water—is introduced into the system from a supply tank or chamber 8, preferably in measured quantities, via the pipe 9, valved at $9^a$. The introduction of material into the system may be by hydrostatic pressure, induced by a column of water which mingles with the material to form the pulpy mass, or by air or gas pressure when the material is previously mixed with the desired quantity of water. The pipe 9 may have a gauge $9^b$ connected therewith to insure maintenance and control of the desired pressure, with a pet cock $9^c$.

From the tank or chamber 8 the pulpy mass passes to a vertically disposed pipe 10, and thence via a lower connection or loop 11, valved at 12, to the chamber 1. The pressure of such flowing material is sufficient to overcome the inertia of the body of mercury lying partly in the chamber 1, and partly in the pipe 10 and connection 11, and raise such mercury into the chamber 1 where, due to the continued flow under the desired pressure of the material being treated, such mercury will be held in suspension and agitated and the turbulence created will cause the entering material to be thoroughly commingled therewith and the gold particles contained in such material will be caught by and amalgamated with the mercury. The expansion chambers 1 and 1a are so constructed and shaped as to be capable of receiving the mass of gold-containing material at a suitable velocity, and to allow the mercury to be held in suspension and elevated and expanded into the relatively larger upper portion of such chambers, the walls of which are preferably tapered; causing activation, agitation or globular action and elevating the globules into the upper expansion chamber 2.

After agitation of the mercury and gold-bearing material in the chambers 1 and 2, the residue, which may still contain some gold particles, may pass via a connection 13 to a second vertical pipe 10a, to a lower connection 11a, valved at 12a, to a second pair of mercury-containing expansion chambers indicated at 1a and 2a, in which the separation and further amalgamation may be continued by agitation under the hydrostatic or other pressure as in the chambers 1 and 2; the chambers 1a and 2a, being of a character identical with the chambers 1 and 2, and receiving charges of mercury in the same manner. From the chamber 2a, the residue may pass to a connection 14, having an outlet 14a, and thence to any point of delivery. To prevent siphonage, the connection 14 is provided with a vent valve 15.

A more or less solidified mass of mercury and recoverable metal forms in the upper expansion chamber 2 (or 2a) as well as in the chamber 1 (or 1a); amalgamation being effected in both chambers or sets of chambers. The outlet 5 leading from the upper part of the expansion chamber 2 may be of the same size and the inlet 4 to the lower expansion chamber 1; and such outlet depends into the upper part of the upper expansion chamber a predetermined distance; permitting agitation and preventing undue, or in fact any, discharge of the mercury and the gold particles amalgamated therewith. The connecting passage 3 may be and is by preference slightly larger than the inlet and outlet passages 4 and 5.

The residue from the expansion chamber 2, which may contain some gold particles, passes through the outlet 5 and a top loop or connector 13 into a vertical delivery pipe 10a, and thence to the secondary group of mercury-containing separating chambers 1a and 2a in which the operation above described may be repeated. There may be a plurality of sets of these mercury-containing separating chambers arranged in series so that the material undergoing separation may be treated as often as may be necessary or desired for complete recovery and/or amalgamation of the gold particles present in any charge under treatment. The residue finally passes through outlet 14a to a point of discharge.

After the predetermined quantity of material has been delivered from the supply chamber and the gold particles from such material have become satisfactorily and/or completely amalgamated with the mercury in any or all of the expansion chambers, 1, 2, et seq., the pipe 9 leading from the source of pressure is closed by means of the valve 9a, and flow through the system ceases. This causes the gold-containing mercury or amalgam to drop to the bottom loops or connections 11, 11a, which are provided with three-way valves 12, 12a. By proper movement of these valves, the bottom loops or connections are placed in communication with the discharge outlets 17, 17a, and the mercury with its accompanying gold may be discharged into a suitable receptacle or container, which may deliver to or communicate with a retort or crucible, as hereinbefore described, for vaporizing and/or condensing the mercury and extracting the gold.

Before the gold-containing mercury or amalgam is discharged I desire to remove from the system all the gangue in the form of sand and/or other residue, and for this purpose I propose to wash this residue from the system. For this purpose the pipe 10 has a connection 18 leading from a source of clear water under pressure; such connection being controlled by a valve 18a. After the amalgamating treatment has stopped, following closure of the valve 9, the valve 18a is opened to admit clear water to the pipe 10 from a suitable source and under pre-determined pressure to cleanse the system, including the expansion chambers, from all residue not amalgamated with the mercury, which residue will pass through the several bodies of mercury, without undue agitation, to the outlet 14a. The valve 18a is then closed, and the valves 12, 12a, opened to discharge the masses of gold-containing mercury or amalgam from the respective sets of expansion chambers to the pipes 17 or 17a; the pet cock 9c being opened if necessary or desirable.

The pressure of fluid from source 18 may be so regulated by operation of the valve 18a as to assist in controlling the flow of the solid portion of the mass of material undergoing separation and to elevate the mercury into the expansion chambers 2 and 2a and hold the same in suspension, if such action is necessary while the system is in operation as, for instance, if the pressure feeding the material undergoing treatment is insufficient.

For visual observance of the action of the mercury, the pipe 10, forming one of the inlet passages of the system, as well as the expansion chambers 1 and 2, and 1a and 2a, may be made of glass of suitable thickness. All parts of the system, excepting the expansion chambers 1 and 2, and 1a and 2a, and the pipe 10; the former leading from the inlet source, are made of suitable material that will resist any chemical action of the mercury. Stuffing boxes 19 are provided for all joints or connections with the glass elements, with provision for linear expansion.

While I have shown and described my improved amalgamating apparatus with particular reference to the recovery of gold and/or other precious metals obtained from what is known as placer sands, it will be understood that it will also function in an exactly similar manner in the separation of gold from auriferous ores or rock reduced to granular form of proper size, which may be the size of sand, by crushing, grinding, or pulverizing the same, and the size or capacity of any unit or units can be increased or reduced as may be desired.

I claim:

In a mercury amalgamator, the combination of a pair of directly communicating expansion chambers in vertical alignment and arranged to receive separate bodies of mercury and gold-bearing material in suspension and activation therewith; said chambers increasing in area from bottom to top and having a contracted passage directly connecting the same, a valved inlet above the upper chamber for the introduction of mercury, means for delivering combined bodies of liquid and pulpy masses of gold-bearing material in controlled quantities to the lowermost of said chambers and simultaneously applying hydrostatic or other pressure to raise the gold-bearing material through said mercury; such pressure overcoming the inertia of the mercury and elevating the gold-bearing material through the same and effecting agitation thereof; said upper chamber having its discharge outlet depending into the same to assist in retaining the mercury and its precious metal content during agitation, means for supplying a charge of water under pressure to and through both chambers for passage through the mercury-amalgamated metal contained therein to clear said chambers and the passages leading to and from the same of non-amalgamated residue after the desired amalgamation of the gold-bearing content of a charge has been effected, a loop or bend in communication with the lower expansion chamber, and a three-way valve disposed in said loop; such valve when in one position providing for the passage of gold-bearing material and water to the several expansion chambers and when in another position permitting discharge of the mercury-amalgamated metal.

J. LEWIS LUCKENBACH.